United States Patent

Dee et al.

[11] Patent Number: 4,549,620
[45] Date of Patent: Oct. 29, 1985

[54] ELECTRONIC CONTROL SYSTEM FOR A WEIGHING SCALE

[75] Inventors: Gerald M. Dee, Milford; Frank A. Catrambone, Quincy, both of Mass.

[73] Assignee: Pneumatic Scale Corporation, Quincy, Mass.

[21] Appl. No.: 525,300

[22] Filed: Aug. 22, 1983

[51] Int. Cl.⁴ .............................................. G01G 13/26
[52] U.S. Cl. ........................................ 177/60; 177/25; 177/208; 177/DIG. 7; 364/567
[58] Field of Search ...................... 177/2, 25, 114, 165, 177/DIG. 7, 50, 208, 60, 63, 64; 364/564, 567; 73/753

[56] References Cited

U.S. PATENT DOCUMENTS

| | | | |
|---|---|---|---|
| 2,704,197 | 3/1955 | Howard | 177/114 X |
| 3,648,035 | 3/1972 | Hart et al. | 177/50 X |
| 3,828,869 | 8/1974 | Sellers | 177/50 |
| 4,229,794 | 10/1980 | Foster | 364/567 X |
| 4,363,370 | 12/1982 | Sarkison | 364/567 X |
| 4,448,272 | 5/1984 | Keller et al. | 177/114 X |

Primary Examiner—E. A. Goldberg
Assistant Examiner—Fred L. Kampe
Attorney, Agent, or Firm—Robert T. Gammons; Robert M. Asher

[57] ABSTRACT

A weighing system is disclosed which operates in conjunction with a scale that has a trigger mechanism for terminating the flow of material into the scale's bucket. This system automatically periodically revises a tare signal stored in a latch circuit for combination with a weight signal to produce a net weight signal. The tare signal provides a measure of the residue stuck in the scale bucket. In an additional embodiment of the invention, a programmable controller is used as the means for periodically resetting the tare signal and is used to evaluate the final weight data to determine the average weight and the standard deviation of the weights. These determinations are used by the controller in combination with a predetermined weight to arrive at a computer setpoint signal for adjustment of the triggering of the flow termination so that the final weights will most closely approximate the predetermined weight. Further disclosed is a volume sensor for detecting whether the weighed material fills at least a minimum volume.

23 Claims, 3 Drawing Figures

ELECTRONIC CONTROL SYSTEM FOR A WEIGHING SCALE

BACKGROUND OF THE INVENTION

This invention relates to an electronic control system for use with a weight measuring scale. In particular, the electronic control system of the present invention is designed for use with a pneumatic scale of the type described in U.S. Pat. No. 2,704,197 (Howard).

Pneumatic scales of this type have been widely used because of their accuracy and reliability, particularly in the packaging of cereals. The precise accuracy of the pneumatic scale results from a large weight-to-scale deflection factor, since all scale movement occurs only at and around the label weight of the box. The buoyancy created by the air suspension of the scale isolates the scale from environmental and machine vibrations.

A problem frequently encountered with the pneumatic scales, especially in the cereal box filling application, is the build-up of residue inside the scale. For example, sugar on sugar-coated cereals will often stick to the scale after the product has been released into the box. This residue creates inaccuracies in the measuring process.

Furthermore, it was difficult to evaluate the operation of pneumatic scales of the prior art since no numerical output was produced or stored for statistical analysis.

SUMMARY OF THE INVENTION

This invention is directed to an electronically controlled weighing system that provides an automatic tare signal that compensates for residue which accumulates in the scale.

According to one embodiment of the apparatus of this invention, a transducer produces a weight signal which corresponds to the weight of a flowable material deposited in a scale. A latch circuit stores and delivers a tare signal for summing with the weight signal. The tare signal corresponds to the weight of any residue on the scale when the scale is empty of flowable material. The tare signal is the negative of the weight signal produced by the residue. The sum of the weight signal and the tare signal produces a net weight signal which can be used to trigger the termination of the flow of material onto the scale when the weight on the scale approaches a predetermined weight. Periodically the latch circuit is automatically reset to produce a new tare signal at a new value for the weight of the residue.

According to a second embodiment of the apparatus of this invention, a programmable controller is included in the circuitry. An analog to digital converter takes the net weight signal and converts it to a digital net weight signal. The digital net weight signals are fed into the programmable controller. The programmable controller serves several functions. It controls the periodic resetting of the latch circuit to provide new tare signals. It records and analyzes the final weights of the material on the scale after the flow of the material has stopped. From the final weight information, it produces an average weight and a standard deviation for the values received. The average weight is compared to the predetermined weight and the controller produces a computer setpoint signal as a function of the average weight, the standard deviation and the predetermined weight. The computer setpoint signal is used to change the point of triggering so that the final weight comes within acceptable limits of the desired predetermined weight. The computer setpoint signal is summed with the weight signal and the tare signal to produce an adjusted signal. The adjusted signal is used to trigger the termination of the flow of material.

By using a programmable controller the weight data can be recorded and produced at a later date for analysis by the operator of the weighing machine. It is also possible with this device to add a volume sensing device for measuring the volume of flowing material in the scale. By use of this added device the trigger mechanism can be prevented from terminating the flow of material until a minimum volume is reached in the scale. The computer receives a signal from the volume sensor so that it can note in its calculations which weighments were over predetermined weight because of the volume requirement.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
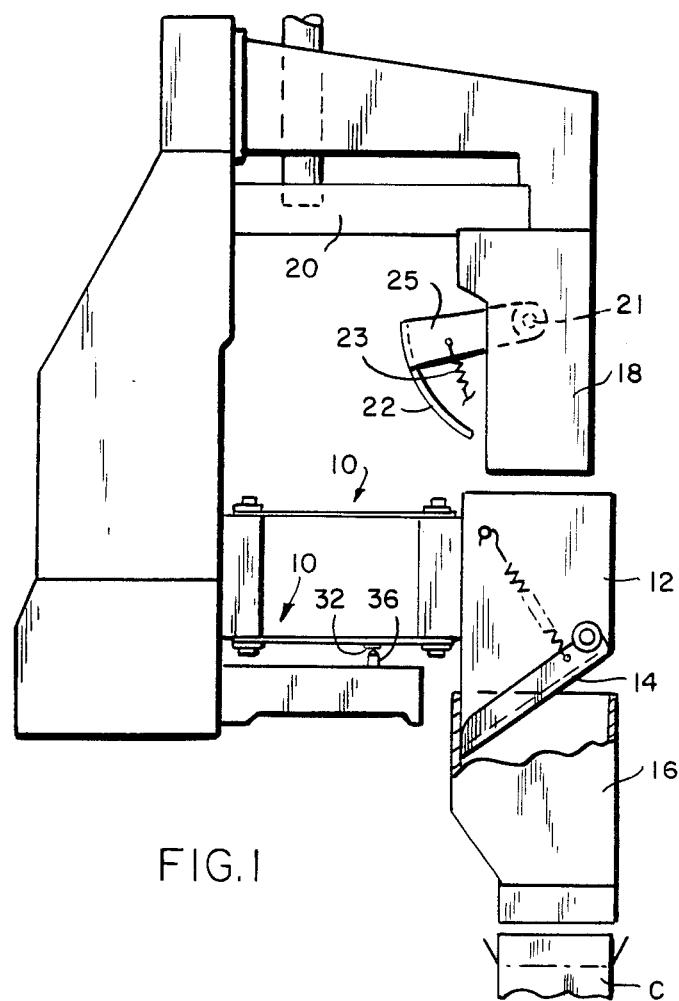
FIG. 1 is a side view of a pneumatic scale for which the present invention can be used.
Figure 2:
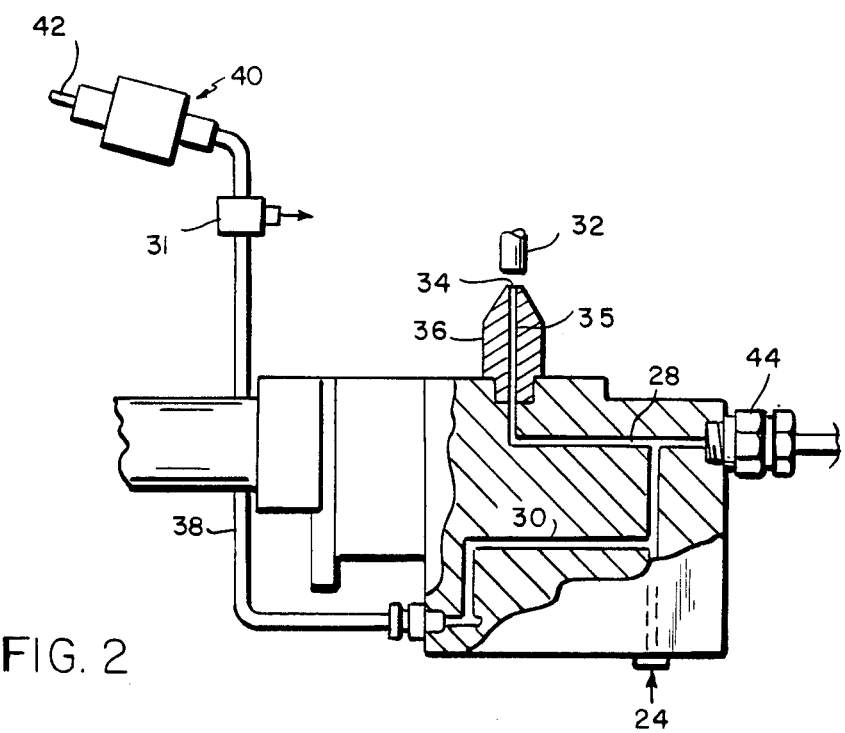
FIG. 2 is a schematic view of the pneumatic control system of the scale of FIG. 1.

Referring now to FIGS. 1 and 2, a pneumatic weighing machine which may be used with the present invention is shown. This weighing machine is disclosed in U.S. Pat. No. 2,704,197 (Howard), the disclosure of which is incorporated by reference herein. A basic description of the pneumatic scale will be described herein with reference to FIGS. 1 and 2. Material is fed to the scale through a vibratory feeder 20. The material passes through hopper 18 onto the scale. The scale has a load receiving bucket 12 at one end to catch the material as it falls from the hopper 18. The load receiving bucket 12 is mounted on cantilevered leaf springs 10. The springs 10 can allow for vertical movement of the load receiving bucket 12 in response to a change in the weight held within said bucket. At the end of the springs 10 opposite the bucket 12, the springs are mounted to the rigid base of the scale. The lower leaf springs 10 are positioned over an airjet member 36. Mounted on the underside of the lower leaf spring 10 is a jet pin 32 which is positioned directly over the airjet member 36 for receiving the pressure created by the air stream arising out of the jet 36.

Referring now to FIG. 2, the air circuitry is shown. The jet pin 32 is located directly over the primary jet orifice 34. As additional weight is added to the bucket 12, a downwards force is exerted by the jet pin 32 against the air stream. The resulting increase in air pressure is transferred through a primary jet chamber 35 so as to be felt throughout the primary air circuit 28. This creates a force against the diaphragm within an air pressure-to-voltage transducer 44. The voltage change caused by transducer 44 is used by the electronic weighing system of the present invention to provide a weight signal proportional to the weight in the bucket 12.

The present invention is generally used to deposit loads of material that weigh a predetermined amount into a package. When the predetermined amount is approached, it is the object of the present weighing system to terminate the flow of material into the load receiving bucket 12. When used with the weighing scales of FIGS. 1 and 2, an electrical signal will be sent to a normally opened three way miniature solenoid valve 31 which when activated will act as an exhaust. The valve 31 is mounted on a vertical air chamber 38 which is connected to a secondary air circuit 30. The secondary air circuit 30 is separate, yet responsive to changes in pressure in the primary air circuit 28. The air for the primary and secondary air circuits is provided through air inlet 24 which receives an air regulated pressure. The termination of the flow of material is triggered when air is exhausted through the valve 31 on the secondary air circuit 30.

The exhaust of air from the secondary air circuit 30 causes a shuttle latch air piston 42 to return to its normal position within air cylinder 40. The air piston 42 releases a latch which holds open a stream interrupting gate 22 shown in FIG. 1. When the valve 31 is exhausted, the latch piston 42 moves from the position in which the air had forced it into its normal position thereby releasing the latch on the stream interrupting gate 22. The gate 22 is connected by gate arm 25 for pivoting about stud 21. When the latch is released a spring 23 rocks the gate closed terminating the flow of material from the hopper 18. After the latch has released the gate there will be material in flight being deposited into the bucket 12. A final weight measurement is made each time material has stopped falling onto the bucket 12 completing a weighment. After each weighment, the material can be released from the bucket by opening the bucket door 14. The material falls through a second hopper 16 into a carton C or some other type of package. After the material has been disposed of into the carton C, the door 14 is reclosed and the gate 22 is reopened.

Figure 3:
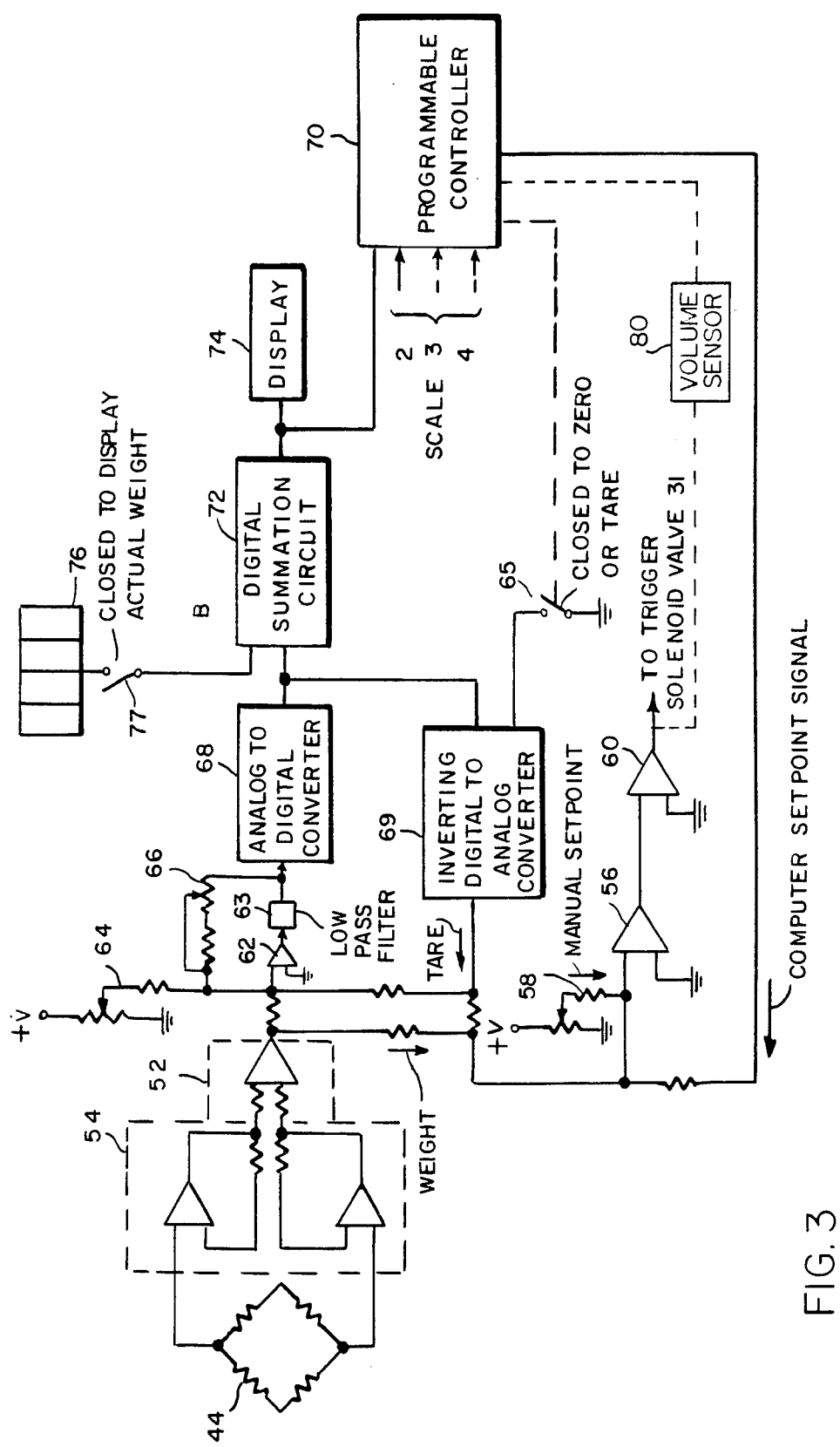
FIG. 3 is a schematic diagram of the electronic weighing system of the present invention.

Reference is now made to the electronic weighing system of the present invention shown in FIG. 3. The weight of material in the scale is felt by the air pressure in the primary air circuit 28. The pressure in the air circuit is converted into an electrical weight signal by the air pressure-to-voltage transducer 44. Inside the transducer 44 as pressure is increased a strain gauge attached to a diaphragm converts the pressure into a gross weight signal proportional to the weight on the scale. In the presently preferred embodiment, a Model AB 5% transducer manufactured by Data Instruments is used as transducer 44. An air scale system of this type is linear only within a small range. Therefore, to get an optimal performance from the system it should be zeroed at the predetermined weight desired for each weighment and the weighing system should be calibrated.

The gross weight signal from the transducer 44 is passed through signal conditioning circuitry basically including a chopper stabilized instrument amplifier 54 and a scaling amplifier 52. The chopper stabilized instrument amplifier 54 conditions the gross weight signal by removing extraneous noise signals. In the presently preferred embodiment, the gross weight signal from the transducer 44 is modulated in a 0221 integrated circuit (not shown). The modulated signal is fed through two 3240E operational amplifiers shown in FIG. 3. The resulting signal is demodulated in a 4066 integrated circuit (not shown). The demodulated signal is scaled in a 714 operational amplifier. The 714 op amp also provides common mode rejection. This design and alternative designs for the signal conditioning circuitry is known by those skilled in the art.

Potentiometers 64 and 66 are provided for zeroing and calibrating the weighing system at the beginning of a weighing operation. Once these potentiometers are set, they need not be readjusted as long as the desired predetermined weight is not changed. To zero the system, a weight which is known to be equal to the desired predetermined weight (the label weight on the cartons being filled) is placed in the load receiving bucket 12. The zeroing pot 64 is adjusted until the output of the scaling amplifier 52 is equal to zero volts. Then a small weight is added to the weight already in the load receiving bucket 12 for the purposes of calibrating the scale. The calibration potentiometer 66 is adjusted until the voltage at the output of the scaling amplifier 52 produces a reading corresponding to the weight of the calibration weight. In a preferred embodiment for cereal weighing, a calibration weight of 0.5 ounces is used. After the calibration has been made, it may be necessary to readjust the zero potentiometer 64 to ensure that an output of zero is still received when the bucket 12 is empty. It may be necessary to repeat the zeroing and calibration processes a couple of times before the two controls properly balance to produce the proper results. After these processes have been completed the signal conditioning circuitry is ready for producing a weight signal that will accurately reflect the weight of material in the load receiving bucket 12. The weight signal will equal zero when the weight in the load receiving bucket 12 is equal to the predetermined weight which was used to zero the weighing system.

When a weighing system of the embodiment described is used to weigh products such as cereals, a residue of sugar tends to stick to the load receiving bucket 12, thereby altering the accuracy of the weights being measured. To correct for this occurrence the weighing system of the present invention provides a tare signal for summing with the weight signal. The tare signal equals the negative of the weight of the residue. The summation of the tare signal and weight signal is performed in the weight read summing amplifier 62. The sum of the weight signal and tare signal provides a net weight signal.

The tare signal is stored and provided by a latch circuit. In the presently preferred embodiment, an inverting digital to analog converter 69 acts as the latch circuit and it stores and provides the tare signal. The tare signal is reset to a new value when the tare switch 65 is operated. When a tare operation is being performed, the load receiving bucket 12 is emptied of material and a weight equal to the predetermined weight is lowered onto the scale. Before beginning the weighing operation after the weighing system has been zeroed and calibrated, the tare signal should be set so that its output is zero. The tare signal is the negative of the weight when the predetermined weight is supported within the load receiving bucket 12.

In the performance of a tare operation, the weight signal is fed from the signal conditioning circuitry into the weight read summing amplifier 62. The signal then passes through low pass filter 63 which preferably has a cutoff of about 4–6 Hz. The weight read summing amplifier 62 and the low pass filter 63 both include a 714 op amp in the presently preferred embodiment. The output of the low pass filter 63 enters an analog to digital converter 68. The signal from the analog to digital converter 68 is then passed to an inverting digital to analog converter 69 where it is inverted and latched. The presently preferred inverting digital to analog converter 69 is a hardware circuit which includes type 714 op amps and type 4076 integrated circuits. Those skilled in the art are able to substitute any number of digital to analog circuits for the presently preferred one. When the tare switch 65 is released the digital to analog converter 69 will continue to store the most recent tare signal for feeding into the weighing system. The tare signal remains unchanged until the tare switch 65 is reactivated for the performance of the next tare operation.

It would be possible to manually depress a tare switch periodically, empty the bucket 12 and lower a predetermined weight onto the scale. However, the present invention provides an automatic means for operating the tare switch 65 which relieves the operator of that task. A programmable controller 70 will count the number of weighments and after a predetermined number of weighments it will ground the tare switch 65 for the taring operation and cause the predetermined weight to be lowered into the bucket 12 after all of the material has been emptied from the bucket. Thus, the weighing system keeps its tare signal current to correspond to the most recent reading of residue remaining in the bucket 12. This enables the system to closely target the final weight and avoid producing an unacceptable number of underweights.

In addition to the weight read summing amplifier 62, the weight signal and tare signal are also summed in an analog summing amplifier 56. In the presently preferred embodiment, a 714 op amp is used as the analog summing amplifier 56. The output of the summing amplifier 56 is called an adjusted signal. The adjusted signal is then fed into a comparator 60 which compares the signal with a predetermined value, which in this embodiment is zero volts. In this case, when the adjusted signal becomes equal to or exceeds zero volts, the comparator 60 will trigger the solenoid valve 31, thereby tripping the latch to release the stream interrupting gate 22. The value of the net weight signal that causes the solenoid valve 31 to trigger is called the predetermined setpoint. Since there will be some material in flight when the gate is tripped the final weight of product in the bucket will exceed the predetermined setpoint. The presently preferred comparator 60 is a 3140 op amp.

The weighing system of the present invention provides two ways to adjust the predetermined setpoint of the weighing system so that the final weight approaches the desired predetermined label weight more closely. A manual setpoint adjustment 58 may be adjusted by the operator to provide a setpoint signal which is added at the analog summing amplifier 56 onto the adjusted signal. In the preferred embodiment, the manual setpoint adjustment would be adjusted by the operator at the beginning of the operation in an attempt to obtain final weights which most closely approximate the desired predetermined weight. After this initial manual adjustment, it is preferred that future adjustments be computer controlled. For this purpose, the programmable controller 70 is programmed to provide a computer setpoint signal having a magnitude which should result in a final weight approximately equal to the predetermined label weight. The presently preferred programmable controller 70 is a Fluke 2400 measurement and control link.

The programmable controller 70 may be used in more than one weighing system at the same time. The controller 70 receives, anaylzes and records the weight data being produced by the weighing system in order to formulate an accurate computer setpoint signal. The net weight signal provided in the system by adding the weight and tare signals passes through the analog to digital converter 68, this produces a digitial net weight signal. The presently preferred analog to digital converter is an Intersil 7103. The digital net weight signal is fed into a digital summation circuit 72. The other input to the digital summation circuit 72 is a thumbwheel 76. The thumbwheel 76 should be manually adjusted to equal the predetermined label weight. Thus, the sum produced by summation circuit 72 will be the actual weight of the material in the bucket 12, compensation having been made for the most recent reading of residue. This actual weight will be displayed on the display 74 and will be fed into the programmable controller 70 for recording and analysis. There is a latch circuit in the analog to digital converter 68 which will maintain the value of the final weight between weighments. A relay closure activated by the weighing machine resets the latch circuit in the analog to digital converter 68 at the end of each successive weighment.

A switch 77 connects the thumbwheel 76 to the digital summation circuit 72. The switch 77 is generally closed to provide the digital summation circuit 72 with the predetermined label weight used to zero the system so that the output of the summation circuit 72 will equal the actual weight of product in the bucket 12. The output data from the digital summation circuit 72 is in binary coded decimal (BCD). The output of the summation circuit 72 is sent to a display 74 and to the controller 70. The presently preferred display uses model HDSP5303 light emitting diodes manufactured by Hewlett Packard. When the switch 77 is open, the display 74 reads out the deviation from label weight rather than the actual weight on the bucket 12. Thus, the switch 77 could be switched open during the zeroing and calibration processes to get a display of zero when the weighing system is zeroed at the predetermined weight. The digital summation circuit 72 may be designed in a variety of ways known to those skilled in the art. The presently preferred embodiment is designed for simultaneous use of the summation circuit 72 in three different weighing systems. A nines complement summation takes place in a set of 14560 tri-state outputs. The thumbwheel 76 is a four digit BCD thumbwheel.

The programmable controller 70 will analyze the final weight data to produce an average weight and a standard deviation for the weight data. The controller 70 may be used in conjunction with more than one weighing system if so desired. The final weight data is recorded by the controller 70 and may advantageously be accessed by an operator at a later time to facilitate evaluation of the system.

It is an object of most packagers that packages have a final weight as close to the label weight as possible but that the production of more than a specified percentage of underweight packages is avoided. By measuring the standard deviation and the average of the final weights of the products as they are weighed, the controller 70 can analyze the data to arrive at a target weight which will most closely suit the packagers' requirements. The target weight should equal the product label weight plus a certain number of standard deviations. The number of standard deviations added to the product label weight is determined by the prescribed percentage of underweights which is allowable. If the target weight differs from the average weight being produced with the present computer setpoint signal, the programmable controller 70 will adjust the computer setpoint signal in an attempt to get the average weight to equal the target weight. In the presently preferred embodiment the new computer setpoint signal will be adjusted according to the following formula:

$$\text{New computer setpoint signal} = \text{Old computer setpoint signal} - \frac{\text{target weight} - \text{average weight}}{2}$$

The difference between target weight and average weight is divided by two so that no abrupt changes are made to the computer setpoint signal. Thus, the proper computer setpoint signal will be approached gradually. The use of two as a divisor is arbitrary and any other number equal to or greater than one may be used instead.

The computer setpoint signal is an analog signal converted from digital to analog by the input-output system of the controller 70. In the preferred embodiment, the analog summing amplifier 56 sums four signals—the weight signal, the tare signal, the manual setpoint signal and the computer setpoint signal. The result is an adjusted signal which when equal to zero will trigger the solenoid valve 31 causing the stream interrupting gate 22 to close terminating the flow of material into the bucket. The computer analysis of the final weights has produced adjustments to the predetermined setpoint so that when the material in flight falls into the scale bucket 12 the final weight will be approximately equal to the predetermined weight. The combination of the automatic tare and the computer setpoint signal have combined to provide a highly accurate and automatic weighing system.

A feature may be added to the present invention to comply with volume requirements in packaging. Optical volume sensors 80 may be mounted behind the load receiving bucket 12 in such a manner so that they view the height of the product within the bucket 12 through a translucent window. The volume sensors 80 provide an override signal to the scale trip circuitry so that the scale is not tripped until the minimum volume requirement has been satisfied. The volume sensors 80 will also provide a signal to the controller 70 so that it can recognize which final weights were the subject of a minimum volume override.

Of course, it should be understood that various changes and modifications to the preferred embodiments described above will be apparent to those skilled in the art. For example, the tare signal may be produced with a latch circuit independently of the path through an analog to digital converter and a digital to analog converter. It may also be possible to operate the automatic tare switch though a means independent of the programmable controller 70. The components selected for the preferred embodiment may be replaced by other components or circuits that accomplish the same function. These and other changes can be made without departing from the spirit and the scope of the invention and without diminishing its attending advantages. It is therefore intended that such changes and modifications be covered by the following claims.

We claim:

1. An electronic pneumatic scale for repeatedly weighing flowable material in a scale bucket comprising:

spring means for suspending said scale bucket;

an air circuit having an opening aligned with said spring means such that the air pressure in said air circuit is responsive to the position of said spring means and thereby the weight on said bucket;

air pressure to voltage transducer means connected to said air circuit for producing a weight signal corresponding to the weight applied to said scale bucket;

latch means for storing and providing a tare signal corresponding to the weight of residue in said scale bucket after said flowable material has been emptied from said scale bucket;

automatic means for periodically resetting the tare signal stored in said latch means;

means for summing the weight signal and the tare signal to produce a net weight signal; and means for triggering the termination of said flow of material when said net weight signal equals a predetermined setpoint.

2. The scale of claim 1 wherein said triggering means comprises flow interruption means for terminating the flow of material into said scale bucket, a secondary air circuit means for holding said flow interruption means open to allow the flow of material to continue and solenoid valve means for exhausting said secondary air circuit means to cause said flow interruption means to close when said net weight signal equals a predetermined setpoint.

3. The scale of claim 2 wherein said spring means comprises cantilevered leaf springs.

4. The scale of claim 2 further comprising manual means for adjusting said predetermined setpoint.

5. The scale of claim 2 further comprising a programmable controller, coupled to said summing means, for receiving said net weight signal and producing a computer setpoint signal which adjusts said predetermined setpoint.

6. The scale of claim 5 wherein said programmable controller includes means for calculating an average weight and standard deviation of final weights of the flowable material measured on said scale, said final weight being the net weight of the flowable material after each time the flow of material stops entering the scale bucket.

7. The scale of claim 6 wherein the computer setpoint signal is a function of the average weight, the standard deviation and the predetermined weight.

8. An electronic pneumatic scale system having a trigger mechanism for terminating the flow of material into a scale bucket and means for emptying said scale bucket to repeatedly achieve a predetermined weight of material comprising:

spring means for mounting said scale bucket;

an air circuit having an opening aligned with said spring means so that the air pressure in said air circuit is responsive to the position of said spring means and thereby responsive to the weight of said bucket;

air pressure to voltage transducer means for producing a weight signal corresponding to the weight on said scale bucket;

latch means for storing and providing a tare signal corresponding to the weight on said scale bucket when it is empty of flowable material;

first summing means for summing the weight signal and the tare signal to produce a net weight signal;

an analog to digital converter coupled to said first summing means to convert the net weight signal to a digital net weight signal;

programmable controller means coupled to said analog to digital converter, said programmable controller means including;

means for calculating an average weight and a standard deviation for the net weights of the final amount of flowable material measured on said scale bucket after said material stops falling onto said scale bucket, and means for producing a computer setpoint signal as a function of the average weight, the standard deviation and the predetermined weight;

second summing means for receiving and summing the weight signal, the tare signal and the computer setpoint signal to produce an adjusted signal; and comparator means for comparing said adjusted signal to a predetermined value and for producing a triggering signal to cause the termination of the flow of material upon said adjusted signal becoming equal to said predetermined value.

9. The scale of claim 8 further comprising flow interruption means for terminating the flow of material into the scale bucket, a secondary air circuit for holding said flow interruption means open to allow flow of material into said bucket and solenoid valve means connected to said secondary air circuit and responsive to said comparator means for exhausting said secondary air circuit to cause said flow interruption means to terminate the flow of material into said bucket in response to a triggering signal from said comparator means.

10. The system of claim 9 wherein said latch means further includes a digital to analog converter coupled to said analog to digital convertor to reconvert said digital net weight signal to said net weight signal.

11. The system of claim 9 further comprising manual means for producing a setpoint signal, and wherein said second summing means further includes means for receiving the setpoint signal and means for summing the setpoint signal with the weight signal, the tare signal and the computer setpoint signal to produce the adjusted signal.

12. The system of claim 9 further comprising volume sensor means including means for sensing the volume of flowable material on said scale, means for preventing the termination of the flow of material until a predetermined minimum volume is reached and means for sending a signal to said programmable controller means to indicate when said volume sensor means has prevented the termination of the flow of material.

13. The system of claim 9 wherein said programmable controller means further includes means for storing data to indicate the net weights of the final amount of flowable material measured on said scale each time material stops falling onto said scale.

14. The system of claim 9 wherein said programmable controller means further includes means for periodically resetting the tare signal stored in said latch means.

15. An electronic pneumatic scale for weighing a flow of material as it accumulates on said scale and for repeatedly triggering the termination of the flow of material to achieve successive weighments of material approximately equal to a predetermined weight comprising:

air pressure to voltage transducer means for converting a pneumatic signal corresponding to the weight applied to said scale into an electrical weight signal;

means for zeroing the weight signal so that the weight signal equals zero volts when the predetermined weight is applied to said scale;

latch means for storing and providng a tare signal corresponding to the weight of any residue on said scale after said flowable material has been emptied from said scale;

first summing means for summing the weight signal and the tare signal to produce a net weight signal;

an analog to digital converter coupled to said first summing means for converting said net weight signal into a digital net weight signal;

manual means for producing a setpoint signal to control the weight at which the termination of material flow will be triggered;

a programmable controller means coupled to said analog to digital converter, said programmable controller means including:

means for periodically resetting the tare signal stored in said latch means, means for calculating an average weight and a standard deviation for the net weights of the final amount of flowable material measured on said scale after said material stops falling onto said scale, and means for producing a computer setpoint signal as a function of the average weight, the standard deviation and the predetermined weight;

second summing for receiving and summing the weight signal, the tare signal, the setpoint signal and the computer setpoint signal to produce an adjusted signal; and comparator means for comparing said adjusted signal to zero volts and for producing a triggering signal to terminate the flow of material upon said adjusted signal becoming equal to zero volts.

16. The pneumatic electronic scale of claim 15 further comprising a display means coupled to said analog to digital converter for displaying the actual weight of material on said scale.

17. The pnematic electronic scale of claim 15 further comprising:

a thumbwheel to provide a digital signal corresponding to the predetermined weight;

digital summation means for summing the digital signal from said thumbwheel with the digital net weight signal to produce a digital actual weight signal; and means for sending the digital actual weight signal to said programmable controller means and to said display means.

18. The pneumatic electronic scale of claim 15 wherein said latch means further includes a digital to analog converter coupled to said analog to digital convertor to reconvert said digital net weight signal to said net weight signal.

19. The pneumatic electronic scale of claim 15 further comprising volume sensor means including means for sensing the volume of flowable material on said scale, means for preventing the termination of the flow of material until a predetermined minimum volume is reached and means for sending a signal to said programmable controller means to indicate when said volume sensor means has prevented the termination of the flow of material.

20. The pneumatic electronic scale of claim 15 wherein said programmable controller means further includes means for storing data to indicate the net weights of the final amount of flowable material measured on said scale each time material stops falling onto said scale.

21. The pneumatic electronic scale of claim 15 further comprising;
flow interruption means for terminating the flow of material onto said scale;
a secondary air circuit for holding said flow interruption means open to allow material to flow into said scale; and
a solenoid valve connected to said secondary air circuit and responsive to said comparator means to exhaust said secondary air circuit upon receiving a triggering signal from said comparator means to cause said flow interruption means to terminate the flow of material into said scale.

22. An electronic pneumatic scale for repeatedly weighing flowable material in a scale bucket comprising:
spring means for suspending said scale bucket;
an air circuit having an opening aligned with said spring means such that the air pressure in said air current is responsive to the position of said spring means and thereby the weight on said bucket;
air pressure to voltage transducer means connected to said air circuit for producing a weight signal corresponding to the weight applied to said scale bucket;
means, responsive to the weight signal, for triggering the termination of said flow of material.

23. The scale of claim 22 wherein said triggering means comprises flow interruption means for terminating the flow of material into said scale bucket, a secondary air circuit means for holding said flow interruption means open to allow the flow of material to continue and solenoid valve means, responsive to said weight signal, for exhausting said secondary air circuit means to cause said flow interruption means to close.

* * * * *

UNITED STATES PATENT AND TRADEMARK OFFICE
CERTIFICATE OF CORRECTION

PATENT NO. : 4,549,620
DATED : October 29, 1985
INVENTOR(S) : Gerald M. Dee et al It is certified that error appears in the above—identified patent and that said Letters Patent is hereby corrected as shown below:

Claim 22, column 12, line 7, change "current" to --circuit--

Signed and Sealed this

Twenty-third Day of September 1986

[SEAL]

Attest:

DONALD J. QUIGG

Attesting Officer

Commissioner of Patents and Trademarks